United States Patent
Fischer

(10) Patent No.: US 8,879,726 B2
(45) Date of Patent: *Nov. 4, 2014

(54) APPARATUS FOR CALCULATING A RESULT OF A SCALAR MULTIPLICATION

(71) Applicant: Infineon Technologies AG, Neubiberg (DE)

(72) Inventor: Wieland Fischer, Munich (DE)

(73) Assignee: Infineon Technologies AG, Neubiberg (DE)

( * ) Notice: Subject to any disclaimer, the term of this patent is extended or adjusted under 35 U.S.C. 154(b) by 0 days.

This patent is subject to a terminal disclaimer.

(21) Appl. No.: 13/973,360

(22) Filed: Aug. 22, 2013

(65) Prior Publication Data

US 2013/0346461 A1 Dec. 26, 2013

Related U.S. Application Data

(63) Continuation of application No. 12/366,222, filed on Feb. 5, 2009, now Pat. No. 8,542,820.

(51) Int. Cl.
| | |
|---|---|
| *H04L 29/06* | (2006.01) |
| *H04L 9/00* | (2006.01) |
| *G06F 7/57* | (2006.01) |
| *H04L 9/30* | (2006.01) |
| *G06F 7/72* | (2006.01) |

(52) U.S. Cl.
CPC *G06F 7/57* (2013.01); *H04L 9/003* (2013.01); *G06F 2207/7261* (2013.01); *H04L 2209/046* (2013.01); *H04L 9/004* (2013.01); *H04L 2209/08* (2013.01); *G06F 2207/7223* (2013.01); *H04L 9/3066* (2013.01); *G06F 7/725* (2013.01)
USPC .......................................... 380/28; 380/255

(58) Field of Classification Search
CPC ..... H04L 9/3066; H04L 9/3252; H04L 9/003; H04L 9/004; H04L 2209/046; H04L 2209/08; G06F 7/725; G06F 7/57; G06F 2207/7261; G06F 2207/7223
USPC .............................................. 380/28–30, 255
See application file for complete search history.

(56) References Cited

U.S. PATENT DOCUMENTS

| | | | | |
|---|---|---|---|---|
| 7,536,011 | B2 * | 5/2009 | Takenaka et al. ................ | 380/28 |
| 7,602,907 | B2 * | 10/2009 | Zhu et al. .......................... | 380/30 |
| 7,639,808 | B2 * | 12/2009 | Izu et al. ......................... | 380/255 |
| 7,716,459 | B2 * | 5/2010 | Elias et al. ..................... | 712/234 |
| 2003/0142820 | A1 * | 7/2003 | Futa et al. ........................ | 380/30 |

(Continued)

OTHER PUBLICATIONS

Victor S. Miller; "Use of Elliptic Curves in Cryptography"; In Hugh C. Williams, editor, CRYPTO, vol. 218 of Lecture Notes in Computer Science, pp. 417-426. Springer, 1985.

(Continued)

*Primary Examiner* — Philip Chea
*Assistant Examiner* — Kendall Dolly
(74) *Attorney, Agent, or Firm* — Schiff Hardin LLP

(57) ABSTRACT

An apparatus for calculating a result of a scalar multiplication of a reference number with a reference point on an elliptic curve comprises a point selector and a processor. The point selector is configured to select randomly or pseudo-randomly an auxiliary point on the elliptic curve. The processor is configured to calculate the result of the scalar multiplication with a double-and-always-add process using the auxiliary point.

12 Claims, 4 Drawing Sheets

(56) References Cited

U.S. PATENT DOCUMENTS

| | | | |
|---|---|---|---|
| 2008/0019509 A1* | 1/2008 | Al-Gahtani et al. | 380/30 |
| 2008/0025500 A1 | 1/2008 | Izu et al. | |
| 2008/0031444 A1* | 2/2008 | Vasyltsov | 380/2 |
| 2009/0003590 A1* | 1/2009 | Brown | 380/28 |
| 2009/0207997 A1* | 8/2009 | Izu et al. | 380/28 |
| 2009/0323933 A1* | 12/2009 | Longa et al. | 380/30 |
| 2010/0040225 A1* | 2/2010 | Venelli et al. | 380/28 |
| 2010/0067690 A1* | 3/2010 | Han et al. | 380/44 |
| 2010/0183142 A1* | 7/2010 | Katagi et al. | 380/28 |
| 2012/0207298 A1* | 8/2012 | Meyer | 380/28 |

OTHER PUBLICATIONS

Neil Koblitz; "Elliptic Curve Cryptosystems"; Mathematics of Computation, vol. 48, No. 177, Jan. 1987, pp. 203-209.

Alfred J. Menezes and Scott A. Vanstone; "Elliptic Curve Cryptosystems and Their Implementation"; Journal of Cryptology (1993), vol. 6, pp. 209-224.

Sung-Ming Yen and Marc Joye; "Checking Before Output May Not Be Enough Against Fault-Based Cryptanalysis"; IEEE Transactions on Computers, vol. 49, No. 9, Sep. 2000, pp. 967-970.

Wieland Fischer, Christophe Giraud, Erik Woodward Knudsen and Jean-Pierre Seifert; "Parallel scalar multiplication on general elliptic curves over $F_p$ hedged against Non-Differential Side-Channel Attacks"; IACR, Cryptology ePrint Archive, (007), Jan. 2002. Available at http://eprint.iacr.org/2002/007.

Tetsuya Izu and Tsuyoshi Takagi; "A Fast Parallel Elliptic Curve Multiplication Resistant against Side Channel Attacks"; In David Naccache and Pascal Paikkier (Eds); Public Key Cryptography, vol. 2274 of Lecture Notes in Computer Science, Springer-Verlag 2002, p. 280-296.

Marc Joye and Sung-Ming Yen; "The Montgomery Powering Ladder"; In Burton S. Kaliski Jr., C, etin Kaya Ko. c, and Christof Paar (Eds); Cryptographic Hardware and Embedded Systems—CHES 2002, 4th International Workshop, Redwood Shores, CA, USA, Aug. 13-15, 2002, revised papers, vol. 2523 of Lecture Notes in Computer Science, Springer-Verlag 2003; pp. 291-302.

Henri Cohen and Gerhard Frey, editors. Handbook of Elliptic and Hyperelliptic Curve Cryptography. Chapman & Hall/CRC, 2006, Chapter 1, "Introduction to Public-Key Cryptography", pp. 1-15.

Ian Blake, Gadiel Seroussi, and Nigel Smart. Advances in Elliptic Curve Cryptography (London Mathematical Society Lecture Note Series). Cambridge University Press, New York, NY USA, 2005, Chapter 1, Elliptic Curve Based Protocols, pp. 3-19.

Oswald et al. "Randomized Addition-Subtraction Chains as a Countermeasure Against Power Attacks," 2001, pp. 39-50.

Takagi et al. "A Fast Parallel Elliptic Curve Multiplication Resistant Against Side Channel Attacks" 2002, pp. 280-296.

* cited by examiner

APPARATUS FOR CALCULATING A RESULT OF A SCALAR MULTIPLICATION

BACKGROUND

Embodiments of the invention relate to an apparatus or a method for calculating a result of a scalar multiplication of a reference number with a reference point on an elliptic curve.

The use of elliptic curves replaces more and more the RSA method (Rivest-Shamir-Adleman method) in public key cryptography systems. The cryptography for elliptic curves was proposed by V. Miller in "Victor S. Miller. Use of Elliptic Curves in Cryptography. In Hugh C. Williams, editor, CRYPTO, volume 218 of Lecture Notes in Computer Science, pages 417-426. Springer, 1985" and N. Koblitz in "Neil Koblitz. Elliptic Curve Cryptosystems. Mathematics of Computation, 48:203-209, 1987".

Introducing literature about elliptic curves and their cryptography are, for example, the textbooks "Henri Cohen and Gerhard Frey, editors. Handbook of Elliptic and Hyperelliptic curve Cryptography. Chapman & Hall/CRC, 2006," and "Ian Blake, Gadiel Seroussi and Nigel Smart, Advances in Elliptic Curve Cryptography (London Mathematical Society Lecture Note Series). Cambridge University Press, New York, N.Y., USA, 2005." A good short review article is, for example, "Alfred Menezes and Scott A. Vanstone, Elliptic Curve Cryptosystems and Their Implementations. J. Cryptology, 6(4): 229-224, 1993". Since elliptic curves were studied by mathematicians already in the $19^{th}$ century and before, the general literature in this direction is unmanageable, but most of the time only readable by mathematicians.

While at RSA the crucial step for encrypting and decrypting or for generating a signature and verifying a signature is the exponention $m^d$ mod N of a message m modulo a large number N, which is the product of two large and secret prime numbers, the crucial process of the elliptic curve cryptography is the scalar multiplication of a number with a point on the curve.

An elliptic curve $E:=E(F)$ over a finite field F is a finite commutative (Abelian) group. The elements of this group are a solution of an equation of third grade in this field, for example:

$$E(F)=\{(x,y) \in F \times F : y^2 = x^3 + ax + b\} \cup \{0\}$$

or, more generally, $$E(F)=\{(x,y) \in F \times F : y^2 + dxy + ey = x^3 + ax^2 + cx + b\} \cup \{0\}$$

wherein a, b, c, d, e are elements of F, which have to fulfill certain properties. Further, an artificial point O is added. On this set, an addition is defined, which means two points P, Q out of E(F) can be added (and also subtracted), so that a new point R=P+Q is created on this curve. The following laws are valid:
1. Associativity: (P+Q)+R=P+(Q+R).
2. The existence of an identity element: O+P=P.
3. The existence of the inverse elements (−P) to P, so that: (−P)+P=O.
4. Commutativity: P+Q=Q+P.

These laws make the elliptic curve to an Abelian group. In such a group, automatically a scalar multiplication kP is defined by:

$$kP = P + P + \ldots + P \; (k \text{ times})$$

wherein k is an integer out of Z and P is a point on the curve. This scalar multiplication is the central operation in the elliptic curve cryptography. Most of the time, the scalar k is one of the secrets.

Therefore, the scalar multiplication has to be implemented in a secure way, so that the chance for finding out the scalar k, for example, by side channel attacks as SPA or DPA, by fault attacks or save error attacks, is as low as possible.

Side channel attacks are, for example, attacks on implementations of crypto systems, which use observations of timings, power consumption or electromagnetic radiation in order to obtain secret information that is originally supposed to be stored safely. In simple power analysis (SPA), an attacker directly observes a device's power consumption. For example, the amount of power consumed by the device varies depending on the data operated on and the instructions performed during different parts of an algorithm's execution.

Differential power analysis (DPA) exploits characteristic behavior (e.g., power consumption behavior of transistors and logic gates). DPA uses an attacking model and statistical analysis to extract hidden information from a large sample of power traces obtained during controlled cryptographic computation. The use of statistical methods in a controlled DPA environment allows identifying small differences in power consumption, which can be used, for example, to recover specific information, such as the individual bits in a secret key.

Fault attacks are, for example, computational save error attacks (C save error attacks) or memory save error attacks (M save error attacks). The computational save error attack may be developed by inducing any temporary random computational fault inside the arithmetic logic unit (ALU). A memory save error attack needs to induce a temporary memory fault inside a register or a memory location.

A secure implementation of this scalar multiplication in crypto systems as, for example, smart cards, PCs or other security products is of high importance. This includes a protection against, for example, side channel attacks, like SPA (simple power analysis) and DPA (differential power analysis), fault attacks and save error attacks.

For example, an easy method for implementing a scalar multiplication dP is the so-called Double-and-Add method:

```
input:  d=(d_{n-1} ... d_1 d_0)_2 integer, P Point on curve
output: d*P
Q := O;
for (i:=n-1) to 0 by -1 do
    Q ← 2*Q
    if (d_i=1) then
        Q ← Q+P   // now is Q = D_i*P, D_i=(d_{n-1} ... d_{i+1} d_i)_2
    end
end
return Q
```

This is the most known method. Unfortunately it is not secure against SPA and DPA, because the doubling is usually calculated by other formulas than the addition of two points on the curve. These two processes can usually be monitored by the current characteristic and so the secret key can easily be determined.

Therefore a Double-and-always-Add method is often proposed:

```
input:  d=(d_{n-1} ... d_1 d_0)_2 integer, P Point on curve
output: d*P
Q := O;
```

```
        for (i:=n-1) to 0 by -1 do
            Q ← 2*Q
            if (d_i=1) then
                Q ← Q+P
            else
                T ← Q+P
            end
            // now is Q = D_i*P, D_i=(d_{n-1} ... d_{i+1} d_i)_2
        end
        return Q
```

Hereby the current characteristic is balanced and such an attack is not possible anymore. On the other side, this implementation opens the door for save-error attacks (see for example "Sung-Ming Yen and Marc Joye. Checking Before Output May Not Be Enough Against Fault-Based Cryptoanalysis. IEEE Trans. Computers, 49(9):967-90, 2000"). Since the second path of the if/else instruction can be interrupt without changing the output, an attacker may extract information about the secret scalar out of this.

Both methods have also the drawback being not secure against DPA and other error attacks, if implemented naively.

A other method to get the SPA problem under control is the Montgomery ladder:

```
    input:  d=(d_{n-1} ... d_1 d_0)_2 integer, P Point on curve
    output: d*P
    Q_0:= O; Q_1:= P;
    for (i:=n-1) to 0 by -1 do
        (Q_{1-di}, Q_{di}) ← (Q_0+Q_1, 2*Q_{di})
        // now is Q_b = (D_i+b)*P, D_i=(d_{n-1} ... d_{i+1} d_i)_2
        end
    end
    return Q_0
```

Here each round also consists of an addition and a doubling and is therefore secure against SPA. The DPA problem persists further on. This method may calculate the addition faster than other algorithms shown in "Wieland Fischer, Christophe Giraud, Erik Woodward Knudsen and Jean-Pierre Seifert. Parallel scalar multiplication on general elliptic curves over Fp hedged against Non-Differential Side-Channel Attacks. IACR, Cryptology ePrint Archive, (007), January 2007. Available at http://eprint.iacr.org/2002/007", "Tetsuya Izu and Tsuyoshi Takagi. A Fast Parallel Elliptic Curve Multiplication Resistant against Side Channel Attacks. In David Naccache and Pascal Paillier, editors Public Key Cryptography, volume 2274 of Lecture Notes in Computer Science, pages 280-296, Springer, 2002," and "Marc Joye and Sung, Ming Yen, The Montgomery Powering Ladder. In Burton S. Kaliski Jr., C etin Kaya Ko c and Christof Paar, editors. Cryptographic Hardware and Embedded Systems—CHES 2002, 4$^{th}$ International Workshop, Redwood Shores, Calif., USA, Aug. 13-15, 2002, Revised Paper, volume 2523 of Lecture Notes in Computer Science, Springer, 2003, pages 291-302."

BRIEF DESCRIPTION OF THE DRAWINGS

Embodiments according to the invention will be explained in greater detail in the following with reference to the accompanying Figs., in which.

DETAILED DESCRIPTION OF EMBODIMENTS

Figure 1:
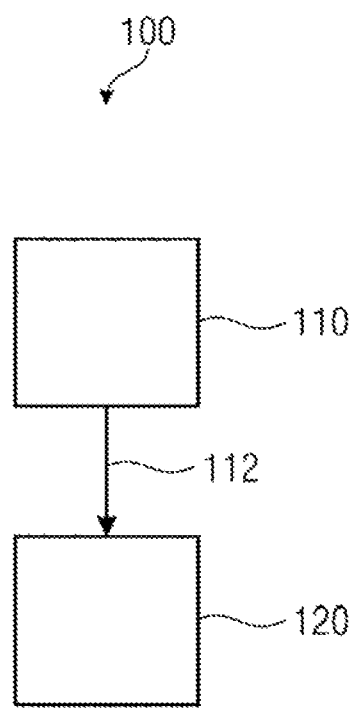
FIG. 1 is a block diagram of an apparatus for calculating a result of a scalar multiplication of a reference number with a reference point on an elliptic curve.

FIG. 1 shows a block diagram of an apparatus 100 for calculating a result of a scalar multiplication of a reference number with a reference point on an elliptic curve according to an embodiment of the invention. The apparatus 100 comprises a point selector 110 connected to a processor 120.

The point selector 110 is configured to select randomly or pseudo-randomly an auxiliary point 112 on the elliptic curve.

The processor 120 is configured to calculate the result of the scalar multiplication with a double-and-always-add process using the auxiliary point 112.

The auxiliary point 112 may be selected independent from the reference point or may be selected based on a mixing function applied to the reference point. A mixing function of the reference point may be, for example, a stochastic function, which generates a random number based on the reference point. The auxiliary point 112 may be based on the random number. Alternatively, the mixing function may be a deterministic function of the reference point using a random or pseudo-random number.

By calculating the result of the scalar multiplication with a double-and-always-add process using the auxiliary point 112, the calculation may be masked by the auxiliary point. Masking the calculation of the result of the scalar multiplication and using a double-and-always-add method may result in a SPA, DPA and save error attack resistant implementation of the calculation of the result of the scalar multiplication.

The processor 120 may be configured to calculate a result of an addition of the auxiliary point 112 with itself and the subtraction of the auxiliary point 112 from an intermediate point or an addition of the negative auxiliary point and the intermediate point. Subtracting the auxiliary point or adding the negative auxiliary point provides the same result, but the implementation may differ.

Further, if the processor 120 is configured to calculate the result of the scalar multiplication without using dummy instructions, the calculation of the result may be protected against save error attacks. Dummy instructions relates to, for example, instructions which are based on a secret parameter of the scalar multiplication (e.g. the reference number) and do not influence the result of the scalar multiplication.

Calculating the result of the scalar multiplication may be immune against save error attacks. Immune in this case means, that the multiplication is protected as well as possible. A 100% immunity may probably never be reached.

Furthermore, the processor 120 may be configured to execute a loop. The loop may be executed N-times, wherein N is a number of bits comprised by the reference number in a binary representation. For example, if the reference number is equal to 9, the binary representation of the reference number would be 1001 and the number of bits comprised by the reference number would be equal to 4. Alternatively the number of bits comprised by the reference number may be defined by the relevant bits of the reference number. For example, if the reference number is equal to 9, the binary representation of the reference number would be 1001, but the reference number may be represented by 8 bits (e.g. due to a register size) and therefore 00001001. Then the leading zeros may not be part of the relevant bits. Further, some bits may be processed during a preprocess and therefore the number of bits comprised by the reference number may be equal to the number of bits not preprocessed. For example, if the reference number in binary representation would be 1001 and the first bit is processed during a preprocess, the number of bits comprised by the reference number would be equal to 3. One example may be to initialize the intermediate point with a point otherwise obtained by executing the loop the first time.

Additionally, the processor 120 may be configured to calculate a current intermediate point depending on a value of a bit of the reference number. For example, if the value of a bit of the reference number is equal to 1, then the reference point is added and the auxiliary point is subtracted from the intermediate point to obtain the current intermediate point. Otherwise, if the value of the bit of the reference number is equal to 0, then only the auxiliary point 112 is subtracted from the intermediate point to obtain the current intermediate point.

Further, the processor 120 may be configured to calculate the current intermediate point during execution of the loop. The calculated intermediate point may be based on the auxiliary point 112. In other words, the intermediate point may be masked by the auxiliary point 112.

In some embodiments according to the invention, all intermediate points calculated during execution of the loop may be based on the auxiliary point 112. In other words, the whole execution of the loop may be masked by the auxiliary point 112.

Additionally, the processor 120 may be configured to set or initialize an intermediate point equal to the auxiliary point.

The processor 120 may calculate the result of the scalar multiplication based on the intermediate point. In other words, during the calculation, an intermediate point may be calculated that is equal to the masked result of the scalar multiplication. Based on this masked result, the result of the scalar multiplication may be determined. In this way, the whole calculation may be masked by the auxiliary point 112 until the result is indirectly available in terms of the masked result.

Some embodiments according the invention relate to an apparatus for calculating a result of a scalar multiplication of a reference number with a reference point on an elliptic curve comprising a means for selecting randomly or pseudo-randomly an auxiliary point and a means for calculating the result of the scalar multiplication with a double-and-always-add process using the auxiliary point.

The means for selecting the auxiliary point may correspond to the point selector mentioned above and may be, for example, a processor, a CPU (central processing unit) of a computer, an ALU (arithmetic logic unit), a crypto processor, a hardwired circuit or a software program to be executed by a CPU (central processing unit) of a computer, an ALU (arithmetic logic unit) or a crypto processor of a crypto system.

The means for calculating the result of the scalar multiplication may correspond to the processor mentioned above and may be the CPU (central processing unit) of a computer, an ALU (arithmetic logic unit), a crypto processor, a hardwired circuit or a or a software program to be executed by a CPU (central processing unit) of a computer, an ALU (arithmetic logic unit) or a crypto processor of a crypto system.

The means for selecting the auxiliary point and the means for calculating the result of the scalar multiplication may both be a software program to be executed by the same CPU (central processing unit) of a computer, ALU (arithmetic logic unit) or crypto processor of a crypto system.

Figure 2:
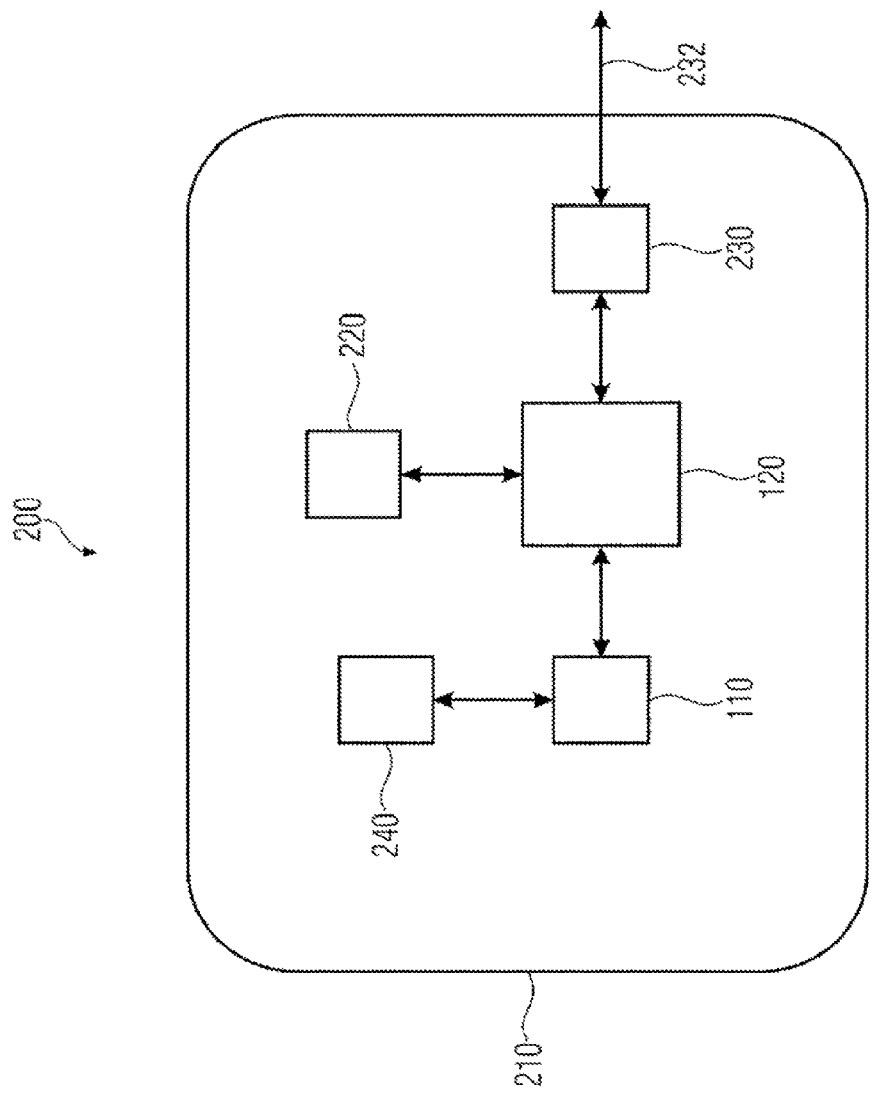
FIG. 2 is a block diagram of a crypto system.

FIG. 2 shows a block diagram of a crypto system 200 with an apparatus for calculating a result of a scalar multiplication of a reference number with a reference point on an elliptic curve according to an embodiment of the invention. The crypto system 200 comprises the point selector 110, the processor 120, a memory 220, an input-output-interface 230 and a random number generator 240.

The crypto system 200 may be implemented, for example, in a smart card 210, a chip card or a computer.

The memory 220 is connected to the processor 120 and configured to store, for example, the reference number, the reference point on the elliptic curve, the elliptic curve itself or parameters of the elliptic curve, the auxiliary point and/or the intermediate point.

The input-output-interface 230 is connected to the processor 120 and configured to provide output data 232 to outside and input data 232 from outside to the processor 120.

Additionally, a random number generator 240 may be connected to the point selector 110. The random number generator 240 may provide a random number, for example, independent from the reference point. The random number generator 240 may be a true random number generator determining the random number, for example based on a property of a phase locked loop (PLL) or a bus traffic within the crypto system, or a pseudo-random number generator as for example a linear or non-linear feedback shift register. The point selector 110 may select the auxiliary point based on the random number.

Figure 3:
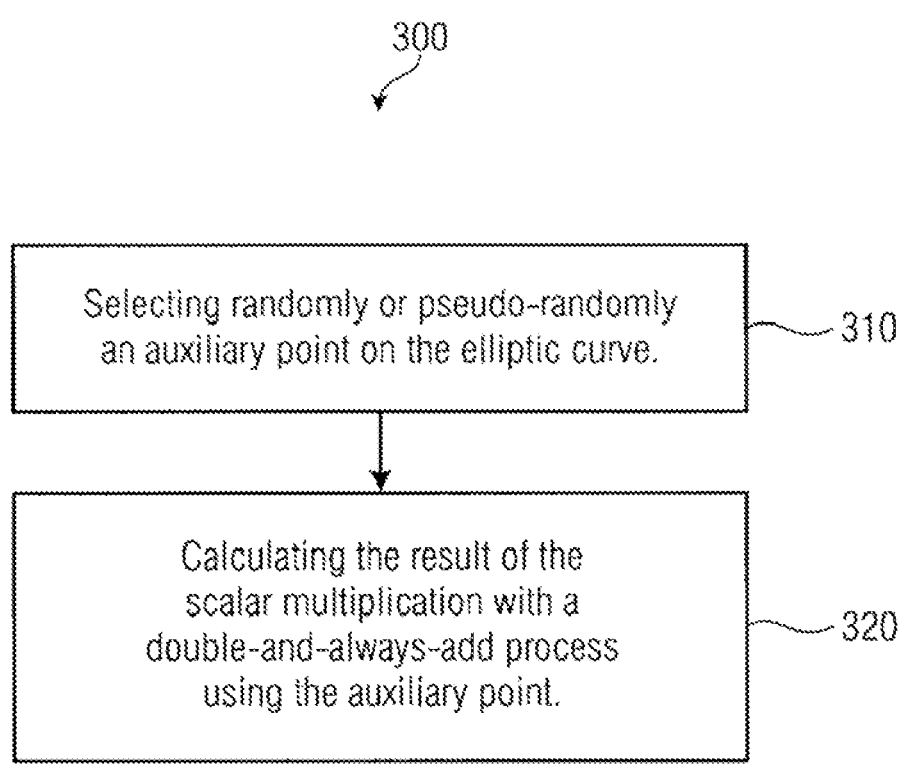
FIG. 3 is a flow chart of a method for calculating a result of a scalar multiplication of a reference number with a reference point on an elliptic curve.

FIG. 3 shows a flow chart of a method 300 for calculating the result of a scalar multiplication of a reference number with a reference point on an elliptic curve according to an embodiment of the invention. The method 300 comprises selecting 310 randomly or pseudo-randomly an auxiliary point on the elliptic curve and calculating 320 the result of the scalar multiplication with a double-and-always-add process using the auxiliary point.

Figure 4:
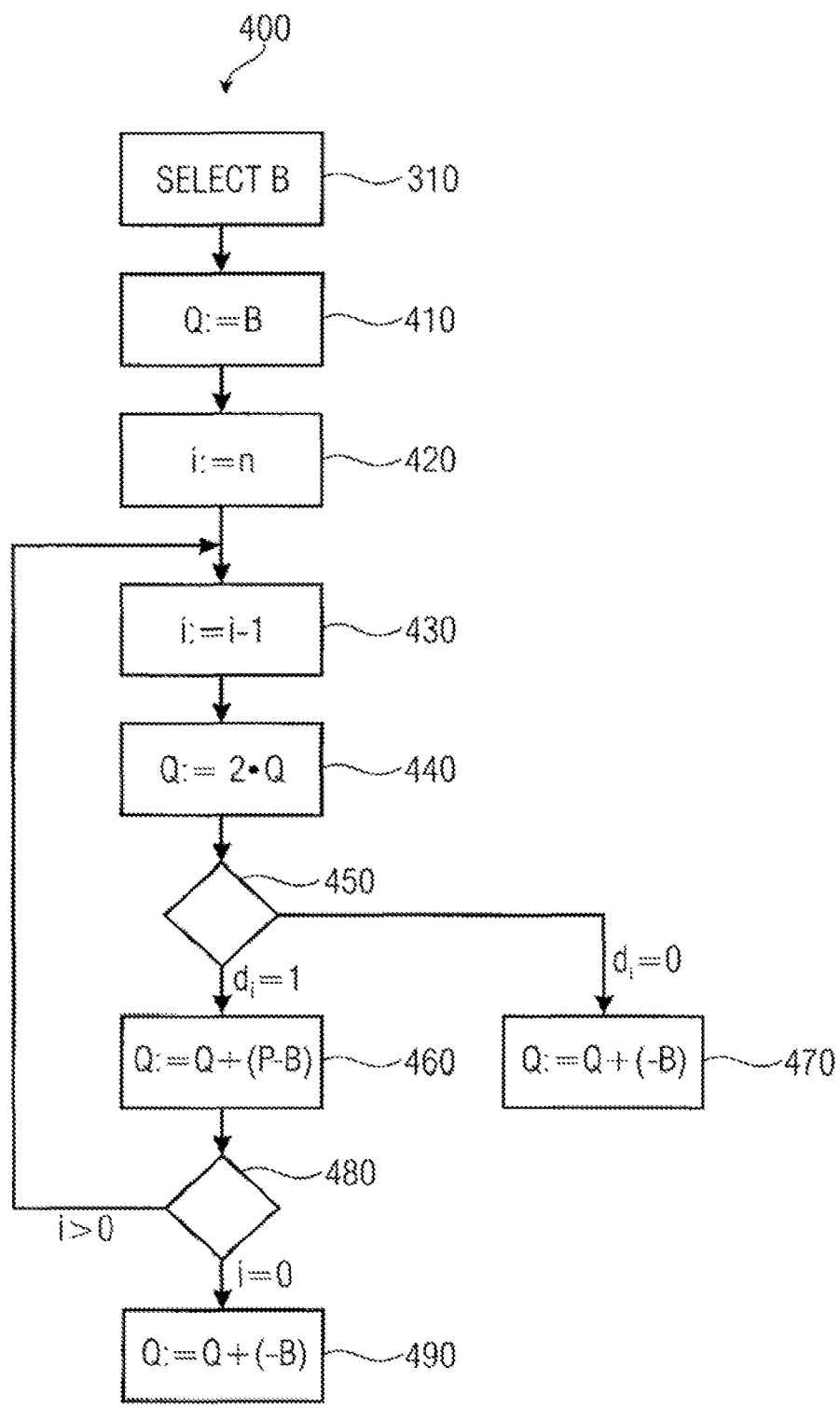
FIG. 4 is a flow chart of a method for calculating a result of a scalar multiplication of a reference number with a reference point on an elliptic curve.

FIG. 4 shows a flow chart of a method 400 for calculating a result of a scalar multiplication of a reference number with a reference point on an elliptic curve according to an embodiment of the invention.

First, the auxiliary point B is selected as described above (shown at reference numeral 310) and an intermediate point Q is set equal to the auxiliary point (shown at reference numeral 410).

Then, a counter i is set equal to the number of bits comprised by the reference number in a binary representation (shown at reference numeral 420).

Within the loop, first, the counter i is decreased by 1 (shown at reference numeral 430) followed by doubling 440 of the intermediate point.

The next step depends on the value of a current bit $d_i$ of the reference number (shown at reference numeral 450). A current bit is that bit of the reference number, which is associated with the current value of the counter i. For example, if the binary representation of the reference number is 1000 and the loop is executed until the counter i is equal to 0, then the bit with the value 1 corresponds to a current counter equal to 3.

If the value of the current bit $d_i$ of the reference number is equal to 1, then the intermediate point is equal to the intermediate point plus the reference point minus the auxiliary point (Q=Q+(P−B), shown at reference numeral 460). Otherwise, if the value of the current bit $d_i$ of the reference number is equal to 0, then the intermediate point is set to the intermediate point minus the auxiliary point (Q=Q+(−B), shown at reference numeral 470).

After this, the loop is executed once again if the counter i is larger than 0 (shown at reference numeral 480). Otherwise, if the counter i is equal to 0, the result of the scalar multiplication is calculated by subtracting the auxiliary point from the intermediate point (Q=Q+(−B), shown at reference numeral 490).

The algorithm of the shown method 400 may also be represented in the following way:

```
input:
    d=(d_{n-1} ... d_1 d_0)_2 integer, P Point on curve
output: d*P
choose random point B on curve;
Q:= B;
for (i:=n-1) to 0 by -1 do
    Q ← 2*Q
    // now is Q = 2*D_{i+1}*P + 2*B,
    if (d_i=1) then
        Q ← Q+(P-B)
        // now is Q = (2*D_{i+1}+1)*P + B,
    else
        Q ← Q+(-B)
        // now is Q = 2*D_{i+1}*P + B,
    end
    // now is Q = D_i*P + B,
end
Q ← Q + (-B)
return Q
```

In this example, d is the binary representation of the reference number with bit numbers starting with 0 for the last significant bit and the highest number for the most significant bit. Furthermore, P represents the reference point, B the auxiliary point, Q the intermediate point and i the counter. $D_i$ indicates a number equal to a value represented by bits of the reference number starting with the (n−i) most significant bits. For example, if the reference number in binary representation is 1010, $D_3$ would be equal to 1, $D_2$ would be equal to 10 in binary representation and 2 in decimal representation, $D_1$ would be equal to 101 in binary representation and 5 in decimal representation and $D_0$ would be equal to 1010 in binary representation and 10 in decimal representation.

As it is shown in this example, the whole calculation is masked with the auxiliary point. Only when the final result of the scalar multiplication is calculated with the last step 490, the masking is removed.

During the calculation, an intermediate point may be overwritten with a new intermediate point, alternatively, several different intermediate points may be used.

The described method may also be called "blended double-and-always-add" method.

Some embodiments according to the invention relate to a method, which uses the fact that the additive inverse of a point on an elliptic curve may be calculated trivial and/or a subtraction of two points may take the same efforts as an addition.

The described method may make it possible to perform a scalar multiplication, wherein all intermediate points are randomized (due to the auxiliary-point-based calculation). Therefore, the method is, in principle, DPA-resistance. Furthermore, the method comprises a continuous course "double-and-always-add", which provides an SPA security. Further, a save error attack may not be possible anymore, because no dummy instruction exists.

In some embodiments according to the invention, a DPA security may be established by calculating with a randomized scalar or calculating in so-called projective co-ordinates. These can be randomized in an easy way.

Some embodiments according to the invention relate to an implementation of a scalar multiplication on a device as, for example, a chip card, a smart card, a computer or another crypto system with a method as effective as possible. Since these chips are further designed as secure units, the scalar multiplication should be protected against a lot of various side channel attacks as, for example, SPA and DPA, fault attacks and save error attacks.

Some further embodiments according to the invention relate to a double-and-add method, wherein an intermediate point is always masked by a randomly chosen point being on the same curve:

$$D_i*P+B, \text{ with } D_i=(d_{n-1} \ldots d_{i+1}d_i)_2.$$

One aspect is that during each execution of the loop, an addition step follows each doubling. Due to the doubling, the following value is obtained:

$$2*D_i*P+2*B.$$

But, after all, the following value should be obtained:

$$(2*D_i+b)*P+B, \text{ with } D_{i-1}=2*D_i+b,$$

wherein B is the value of the associated bit of the reference number. Therefore, either −B (minus the auxiliary point) or P−B (the reference point minus the auxiliary point) must be added. Thus, there is no necessity for a dummy addition and the method is secure against save-error attacks.

Some embodiments according to the invention relate to a scalar multiplication on elliptic curves with additive blinding, secured against SPA, DPA and save error attacks.

In general points on the elliptic curve, as for example the reference point, the auxiliary point and the intermediate point, may be represented by their coordinates (e.g. Cartesian coordinates or projective coordinates) during the calculation. It may also be possible to represent a point on the elliptic curve by only one of the coordinates (e.g. only the x-coordinate of the point) during the calculation.

In the present application, the same reference numerals are partly used for objects and functional units having the same or similar functional properties.

Although some claims only relate to one other claim, also a combination with further claims may be possible.

In particular, it is pointed out that, depending on the conditions, the inventive scheme may also be implemented in software. The implementation may be on a digital storage medium, particularly a floppy disk or a CD with electronically readable control signals capable of cooperating with a programmable computer system so that the corresponding method is executed. In general, the invention thus also consists in a computer program product with a program code stored on a machine-readable carrier for performing the inventive method, when the computer program product is executed on a computer. Stated in other words, the invention may thus also be realized as a computer program with a program code for performing the method, when the computer program product is executed on a computer.

Some embodiments according to the invention relate to a method for calculating a result of a scalar multiplication of a reference number with a reference point on an elliptic curve. The method includes selecting randomly or pseudo-randomly an auxiliary point on the elliptic curve, wherein the auxiliary point is selected independent from the reference point; setting an intermediate point equal to the auxiliary point; executing a loop, wherein the loop is executed N-times, wherein N is a number of bits comprised by the reference number in a binary representation; and calculating the result of the scalar multiplication based on a subtraction of the auxiliary point from the intermediate point or an addition of the negative auxiliary point and the intermediate point. Executing the loop includes calculating a result of an addition of the intermediate point with itself; and calculating a current intermediate point depending on a value of a current bit of the reference number, wherein the reference number is represented binary, wherein the current intermediate point is equal to the intermediate point plus the reference point minus the auxiliary point if the value of the current bit is equal to 1 or wherein the current intermediate point is equal to the intermediate point minus the auxiliary point if the value of the current bit is equal to 0.

The invention claimed is:

1. An apparatus for calculating a result of a scalar multiplication of a reference number with a reference point on an elliptic curve, comprising:
    a point selector configured to select randomly or pseudo-randomly an auxiliary point on the elliptic curve, wherein the reference point and the auxiliary point are different points on the elliptic curve, wherein the point selector is configured to select the auxiliary point independent from the reference point or wherein the auxiliary point is selected based on a mixing function applied to the reference point; and
    a hardware processor configured to calculate the result of the scalar multiplication with a double-and-always-add process using the auxiliary point, wherein the hardware processor is configured to calculate the result of the scalar multiplication based on a loop, which, per execution, operates on an intermediate point, wherein the loop is executed N-times, wherein N is a number of bits comprised by the reference number in a binary representation, wherein the hardware processor is configured to calculate the result of a subtraction of the auxiliary point from the intermediate point, wherein the subtraction is a part of the loop.

2. An apparatus for calculating a result of a scalar multiplication of a reference number with a reference point on an elliptic curve, comprising:
    a point selector configured to select randomly or pseudo-randomly an auxiliary point on the elliptic curve, wherein the reference point and the auxiliary point are different points on the elliptic curve, wherein the point selector is configured to select the auxiliary point independent from the reference point or wherein the auxiliary point is selected based on a mixing function applied to the reference point; and
    a hardware processor configured to calculate the result of the scalar multiplication with a double-and-always-add process using the auxiliary point, wherein the hardware processor is configured to calculate the result of the scalar multiplication based on a loop, which, per execution, operates on an intermediate point, wherein the loop is executed N-times, wherein N is a number of bits comprised by the reference number in a binary representation, wherein the hardware processor is configured to calculate the result of the scalar multiplication based on an addition of the intermediate point with itself and a subtraction of the auxiliary point from the intermediate point.

3. The apparatus according to claim 1, wherein the hardware processor is configured to calculate a current intermediate point depending on a value of a bit of the reference number, wherein the reference number is represented in a binary form.

4. The apparatus according claim 1, wherein the hardware processor is configured to calculate a current intermediate point during executing the loop, wherein the current intermediate point is based on the auxiliary point.

5. The apparatus according to claim 4, wherein all intermediate points calculated during executing the loop are based on the auxiliary point.

6. The apparatus according to claim 1, further comprising:
    a memory coupled to the hardware processor and configured to store the reference number, the reference point on the elliptic curve, the elliptic curve itself or parameters of the elliptic curve, or the auxiliary point; and
    a random number generator coupled to the point selector and configured to provide a random number, wherein the random number is used by the point selector to select the auxiliary point on the elliptic curve.

7. The apparatus according to claim 1, further comprising:
    a memory coupled to the hardware processor and configured to store the reference number, the reference point on the elliptic curve, the elliptic curve itself or parameters of the elliptic curve, the auxiliary point or the intermediate point; and
    a random number generator coupled to the point selector and configured to provide a random number, wherein the random number is used by the point selector to select the auxiliary point on the elliptic curve.

8. The apparatus according to claim 1, wherein the hardware processor is configured to calculate the result of the scalar multiplication based on the following algorithm:

```
choose random point B on curve;
Q:= B;
for (i:=n-1) to 0 by -1 do
    Q ← 2*Q
    if (d_i=1) then
        Q ← Q+(P-B)
    else
        Q ← Q+(-B)
    end
end
Q ← Q + (-B)
return Q,
``` wherein Q is an intermediate point, B is the auxiliary point, i is a counter, di is a value of a current bit of the reference number and P is the reference point.

9. A crypto system comprising
    an apparatus for calculating a result of a scalar multiplication of a reference number with a reference point on an elliptic curve, the apparatus being implemented by a hardware processor programmed to, or a circuitry configured to,
    select randomly or pseudo-randomly an auxiliary point on the elliptic curve, wherein the reference point and the auxiliary point are different points on the elliptic curve,
    wherein the selection of the auxiliary point is independent from the reference point or wherein the auxiliary point is selected based on a mixing function applied to the reference point; and
    calculate the result of the scalar multiplication with a double-and-always-add process using the auxiliary point, based on a loop, which, per execution, operates on an intermediate point, wherein the loop is executed N-times, wherein N is a number of bits comprised by the reference number in a binary representation, and by calculating the result of a subtraction of the auxiliary point from the intermediate point, wherein the subtraction is a part of the loop.

10. The crypto system according to claim 9, wherein the crypto system is a smart card.

11. A method for calculating a result of a scalar multiplication of a reference number with a reference point on an elliptic curve, the method being performed, by a hardware processor, or a circuitry, comprising:
    selecting randomly or pseudo-randomly an auxiliary point on the elliptic curve, wherein the reference point and the auxiliary point are different points on the elliptic curve, wherein the auxiliary point is selected independent from the reference point or wherein the auxiliary point is selected based on a mixing function applied to the reference point; and calculating, by a hardware processor, the result of the scalar multiplication with a double-and-always-add process using the auxiliary point, wherein the calculation of the result of the scalar multiplication is performed based on a loop, which, per execution, operates on an intermediate point, wherein the loop is executed N-times, wherein N is a number of bits comprised by the reference number in a binary representation, wherein, as part of the loop, the result of a subtraction of the auxiliary point from the intermediate point is computed or, wherein the result of the scalar multiplication is based on an addition of the intermediate point with itself and a subtraction of the auxiliary point from the intermediate point.

12. A non-transitory machine-readable carrier having stored thereon a computer program for performing the method for calculating a result of a scalar multiplication of a reference number with a reference point on an elliptic curve, comprising:

selecting randomly or pseudo-randomly an auxiliary point on the elliptic curve, wherein the reference point and the auxiliary point are different points on the elliptic curve, wherein the auxiliary point is selected independent from the reference point or wherein the auxiliary point is selected based on a mixing function applied to the reference point; and calculating the result of the scalar multiplication with a double-and-always-add process using the auxiliary point, wherein the calculation of the result of the scalar multiplication is performed based on a loop, which, per execution, operates on an intermediate point, wherein the loop is executed N-times, wherein N is a number of bits comprised by the reference number in a binary representation, wherein, as part of the loop, the result of a subtraction of the auxiliary point from the intermediate point is computed or, wherein the result of the scalar multiplication is based on an addition of the intermediate point with itself and a subtraction of the auxiliary point from the intermediate point.

\* \* \* \* \*